United States Patent
Cohen

[15] 3,668,385
[45] June 6, 1972

[54] APPARATUS AND METHODS FOR IMPROVING MEASUREMENTS PERFORMED UPON GASEOUS SAMPLES BY REDUCING SAMPLE CONTAMINATION

[72] Inventor: Martin J. Cohen, West Palm Beach, Fla.
[73] Assignee: Franklin Gno Corporation, West Palm Beach, Fla.
[22] Filed: Oct. 13, 1969
[21] Appl. No.: 865,738

[52] U.S. Cl................250/41.9 TF, 250/41.9 G, 250/41.9 S
[51] Int. Cl.....................................H01j 39/34, B01d 59/44
[58] Field of Search...................................250/41.9 G, 41.9 S

[56] References Cited

UNITED STATES PATENTS

| 2,601,097 | 6/1952 | Crawford | 250/41.9 S |
| 2,959,677 | 11/1960 | Robinson | 250/43.5 |

Primary Examiner—James W. Lawrence
Assistant Examiner—C. E. Church
Attorney—Raphael Semmes

[57] ABSTRACT

Variation of sample concentration, by gain from or loss to the wall of a measurement chamber or sample inlet pipe, is avoided by extracting the central gas core of a streamline sample flow. Measurements are performed upon trace sample components by drift cell techniques.

17 Claims, 3 Drawing Figures

PATENTED JUN 6 1972  3,668,385
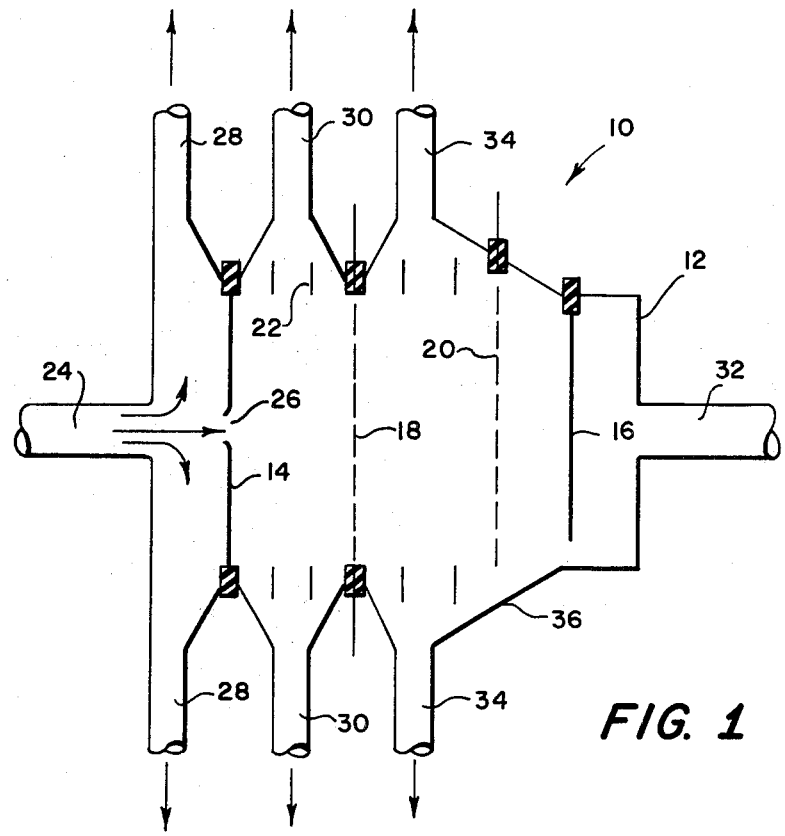
FIG. 1
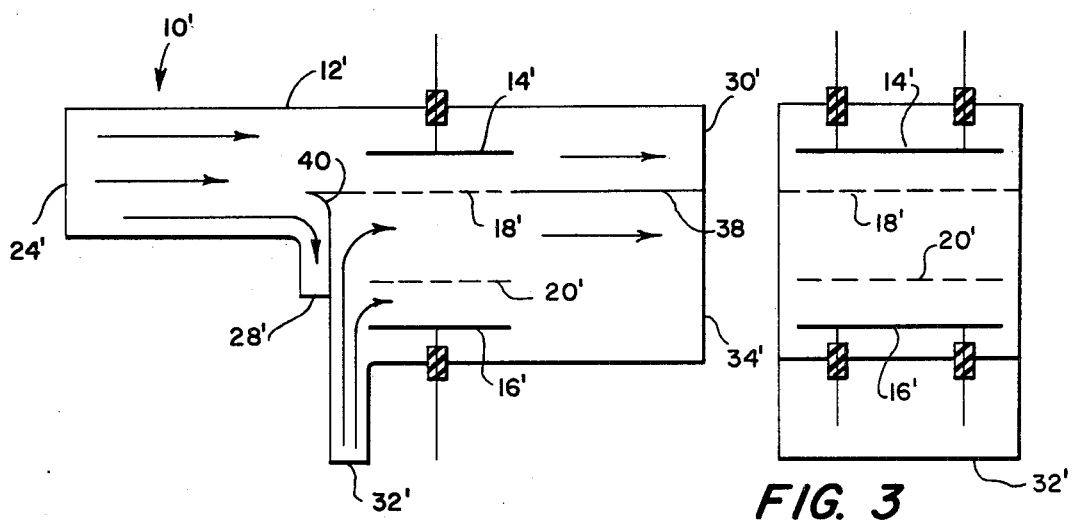
FIG. 2
FIG. 3
INVENTOR
MARTIN J. COHEN
BY Raphael Semmes
ATTORNEY

3,668,385

APPARATUS AND METHODS FOR IMPROVING MEASUREMENTS PERFORMED UPON GASEOUS SAMPLES BY REDUCING SAMPLE CONTAMINATION

BACKGROUND OF THE INVENTION

This invention relates to apparatus and methods for performing measurements upon gaseous samples and more particularly is concerned with measurements upon low levels of trace gases, where variation of sample concentration is important.

The copending application of Martin J. Cohen, Ser. No. 864,046, filed Oct. 6, 1969, for "Apparatus and Methods for Enhancing the Measurement of Trace Gases," discloses the use of heat to reduce the accumulation of sample substances upon the walls of the measurement chamber and sample inlet. Although wall attachment of sample material can be significantly reduced by the application of heat, there are instances where heating may be inconvenient or undesirable, as, for example, when the temperature is limited by decomposition of the trace material.

BRIEF DESCRIPTION OF THE INVENTION

The present invention is concerned with the utilization of the central gas core of a streamline sample gas flow to avoid variation of sample concentration (as may occur by wall attachment, for example), and it is a principal object of the invention to provide apparatus and methods for such purposes.

Briefly stated, typical embodiments of the invention employ a "Plasma Chromatograph" drift cell, referred to more fully hereinafter, which receives a gaseous sample through an inlet. Variation of the concentration of the sample actually measured is avoided by utilizing only the central gas core of a streamline sample gas flow.

BRIEF DESCRIPTION OF THE DRAWING

The invention will be further described in conjunction with the accompanying drawing, which illustrates preferred and exemplary embodiments, and wherein:

FIG. 1 is a diagrammatic longitudinal sectional view of a first form of the invention;

FIG. 2 is a similar view of a second form of the invention; and

FIG. 3 is a diagrammatic transverse sectional view of the embodiment of FIG. 2.

DETAILED DESCRIPTION OF THE INVENTION

Before the invention is described in detail, reference will be made to the subject of "Plasma Chromatography," which is disclosed more fully, for example, in the copending application of Martin J. Cohen, David I. Carroll, Roger F. Wernlund, and Wallace D. Kilpatrick, Ser. No. 777,964, filed Oct. 23, 1968, and entitled "Apparatus and Methods for Separating, Concentrating, Detecting, and Measuring Trace Gases". The "Plasma Chromatography" system involves the formation of primary ions and the reaction of such primary or reactant ions with molecules of trace substances to form secondary or product ions, which may be concentrated, separated, detected, and measured by virtue of the difference of velocity or mobility of the ions in an electric field. The primary ions may be produced by subjecting the molecules of a suitable host gas, such as air, to ionizing radiation, such as beta rays from a tritium source, corona from a multi-point or wire array, electrons produced by photoemission from a cathode, etc. The primary ions are subjected to an electric drift field, causing them to migrate in a predetermined direction through a reaction space into which the sample or trace gas is introduced. The resultant collisions between primary ions and trace molecules produce secondary ions of the trace gas in much greater numbers than can be produced by mere electron attachment to the trace gas molecules. Secondary ions are also subjected to the electric drift field and may be sorted in accordance with their velocity or mobility.

Referring to FIG. 1 of the drawing, reference numeral 10 designates generally a "Plasma Chromatography" cell of the type disclosed in the aforesaid copending applications. The cell comprises an envelope 12 enclosing a series of electrodes, which may be of parallel plane geometry. Principal electrodes 14 and 16 may be arranged adjacent to opposite ends of the envelope, which may be a circular cylinder, for example, with its axis perpendicular to the principal electrodes. When the apparatus is used to detect negative ions, as will be assumed for example, electrode 14 will be a cathode and electrode 16 an anode. When the apparatus is used to detect positive ions, the polarities will be reversed. The cell preferably includes a pair of shutter grids or ion gates 18 and 20, each of which may comprise two sets of interdigitated parallel wires, alternate wires of each grid being connected together to form the two sets. Cathode 14 or the region of the envelope near this electrode is provided with ionizing means, which may be of the type mentioned previously. Anode 16 may be a collector plate connected to an output device, such as an electrometer, which may be Cary Instruments Model 401 (vibrating reed) type with current sensitivity of $10^{-15}$ amps. at a time constant of 300 milliseconds.

An electric drift field is provided between the principal electrodes 14 and 16. This field may be obtained, for example, from a suitable DC power supply, such as a battery connected across a series-resistor voltage-divider chain. The positive terminal of the chain may be connected to ground and the negative terminal to the cathode 14. Anode 16 may be connected to ground through the input circuit of the electrometer. Taps on the voltage divider may be connected to a series of guard rings 22 spaced along the length of the envelope to maintain the uniformity of the drift field.

Adjacent elements of each shutter grid are normally maintained at equal and opposite potentials relative to a grid average potential established by the voltage divider. Under these conditions, the grid or gate is closed to the passage of electrically charged particles. The potential sources which provide the equal and opposite potentials just referred to may be part of grid drive circuits for applying grid opening pulses to the grids 18 and 20. The grids are opened by driving the adjacent elements of each grid to the same potential, the grid average potential, at predetermined instants.

A sample comprising a suitable host gas, such as air, carrying an appropriate gaseous trace substance, such as triethyl phosphite, flows into the envelope by means of a gas inlet pipe 24. Electrode 14, which forms the left wall of the actual measurement chamber in FIG. 1, is provided with a central aperture 26 of diameter substantially less than the inner diameter of pipe 24. The electrode may have a slight conical lip surrounding the aperture, as shown. Thus, if the flow within pipe 24 is streamlined or laminar, aperture 26 will extract a central gas core from the sample for passage into the space between electrode 14 and grid 18. The wall-adjacent portions of the sample flow will be diverted from the measurement chamber and will exit through outlet pipes 28. Any suitable source of flow pressure, such as a fan or pump, may be employed to move the gaseous sample. In the region between the cathode 14 and the first grid 18, primary ions of the carrier gas or one or more of the main constituents thereof are formed under the influence of the ionizing means at this region. For example, negative oxygen ions may be formed at cathode 14 as by direct attachment of electrons to the oxygen molecules, the sample being subjected to beta rays produced by a tritium foil on the cathode.

The primary ions drift toward the anode 16, and in the reaction space between the cathode and the first shutter grid 18, the primary ions encounter other molecules (at the rate of $10^{11}$ per second in air at atmospheric pressure). A majority of the collisions will be with oxygen, nitrogen, or other non-reactive molecules. A small fraction of the collisions will be with the trace molecules of interest. In these cases, the primary ions will interact with the trace molecules to form secondary ions. Secondary ions will have, in general, an appreciable difference in mobility from the primary ions. The pressure in the measurement chamber of envelope 12 is maintained at a level (preferably about atmospheric) which ensures that the mean free path of ions in the reaction region is short compared to the dimensions of this region, so that ion-molecule collisions are promoted.

The ion flux at the first shutter grid 18 will consist of primary ions and possibly several species of secondary ions. A sample of this mixed ion population is periodically admitted to the drift region between the first and second shutter grids when the first shutter grid 18 is opened by momentarily driving all of the grid wires to the grid average potential. The second shutter grid 20 is opened for a predetermined interval at a predetermined time after the opening of the first grid. The ions that pass through the second grid drift toward and are collected by the anode 16. The resultant output current may be integrated over several cycles to give a measurable current. By scanning the time of opening of the second grid relative to the first, a drift time spectrum of the ion population can be obtained in the output and recorded (current v. drift time). This permits the various ion species to be separated and identified.

Neutral molecules of the sample gas in the space between cathode 14 and shutter grid 18 are exhausted from the envelope by means of outlet pipes 30, which may be connected to a suitable exhaust pump manifold. If the invention is employed in conjunction with the resolution-enhancing techniques described in the copending application of David I. Carroll, Martin J. Cohen, and Roger F. Wernlund, Ser. No. 780,851, filed Dec. 3, 1968, for "Apparatus and Methods for Separating, Detecting, and Measuring Trace Gases with Enhanced Resolution," then an inlet pipe 32 for a non-reactive drift gas, such as nitrogen, may be provided at the end of the envelope 12 opposite to the inlet pipe 24. Outlet pipes for drift gas are provided at 34 and are connected to a suitable exhaust pump manifold. The various outlet pipes 28, 30 and 34 may merge with the cylindrical side wall of the envelope 12 by means of conical transition sections 36.

Since the details of the "Plasma Chromatograph" and its operation are not per se the present invention (and are fully described in the aforesaid copending applications), the foregoing description will suffice as exemplary of the type of instrument to which the present invention may be applied. The present invention is concerned with the avoidance of problems which may be caused by the pick-up and accumulation of sample material on the inlet pipes and the envelope walls. The variation of sample concentration which can occur by interchange with inlet pipe or measurement chamber walls may be quite important where low levels of trace gases are involved and where variations in sample concentration cannot be tolerated. The problem is a function of the gas of the sample, the inlet pipe diameter and length, and the material of the inlet pipe and measurement chamber.

For application of the present invention, two basic conditions must be satisfied, namely: (1) streamline flow of the gaseous sample, and (2) minimum diffusion between the sample core and the walls of the inlet pipe. As can be seen in FIG. 1, the sample flow adjacent to the walls of the inlet pipe 24 is diverted and does not enter the measurement chamber. Therefore, if the conditions of laminar flow and minimum diffusion are satisfied, the desired results of the invention are achieved. It is also beneficial if materials having low reactivity, such as Teflon, are employed in the construction of the inlet tube and drift cell chamber.

For laminar or streamline flow to take place in a pipe, the Reynolds number must be about 2000 or lower. By definition, the Reynolds number is $R = 2r V\rho/\mu$    (1)

where:

$r$ is radius of pipe in feet $V$ is flow velocity in feet/sec $p$ is density of sample in lbs mass/ft$^3$ = 0.370 lbs/ft$^3$ (av.) for air $\mu$ is viscosity of sample in lbs mass/(ft sec) = $1.2 \times 10^{-5}$ for air. i.e. $1/27 \times^{-4}$ 3/sec.

Typically, for a fixed rate of gas flow such as 1 liter/min, which is typical of Plasma Instrument use, the pipe diameter x velocity product is a constant, i.e., $4\pi r^2 V = 1$ liter/min = $1/27 \times 60 \times 6.2 \times 10^{116\ 4}$ ft3/sec.

In the Reynolds number, the $rV$ product should be small. Thus, the largest diameter pipe is desirable. For a 0.03 ft. or 1 cm diameter pipe:

$$rV = \frac{6.2 \times 10^{-14}}{\pi r} = \frac{3.1 \times 10^{-4}}{3.1 \times 3 \times 10^{-2}} \cong 3.5 \times 10^{-3}$$

and $$R = \frac{2rV\rho}{\mu} = \frac{7 \times 10^{-3} \cdot .37}{1.2 \times 10^{-5}} = 220$$

Thus, for this example, laminar flow is expected, since $R$ is well below 2,000.

The next criterion is the diffusion mixing requirement. On the basis that the wall will change the boundary layer concentration of a trace material which in turn causes a concentration gradient, the effect on the central concentration in the pipe may be calculated.

The standard relation for the average displacement of a molecule under influence of diffusion is given by two dimension, approximately by $$\bar{x} \cong \sqrt{3Kt} \quad (2)$$

where $x$ is the average displacement in cm in t sec and $K$ is the diffusion coefficient. Typically, $K$ is about 0.02 cm$^2$/sec for trace molecules.

Thus,     $\bar{x} = \sqrt{3 \times .02 \times 1} \cong .25$ cm in one sec.

Typically, it is desired that for any length of pipe L with a diameter of $2r$ and a flow of F that streamline flow hold and that the time of pipe transit be short enough to avoid wall effects.

On these considerations in the example, a pipe length of 1 foot (30 cm) has a transit time determined as follows:

$$F = \pi r^2 \frac{L}{t} = \frac{1 \text{ liter}}{\text{min}} = \frac{10^3 \text{ cm}^3}{60 \text{ sec}}$$

Thus,     $t = \frac{60\pi}{10^3} \left(\frac{1}{2}\right)^2 \times 30 = \frac{4.5\pi 10^2}{10^3} = 1.3$ sec and     $\bar{x} \cong .4$ cm.

Thus, within the distance of about 0.1 cm from the center (where $r = 0.5$ cm), there is negligible influence of the trace concentration in passing through the pipe.

FIGS. 2 and 3 illustrate an embodiment of the invention wherein the "Plasma Chromatograph" electrodes are placed in a duct of rectangular cross-section. Primed reference numerals are employed to indicate corresponding parts designated by unprimed numerals in FIG. 1. The envelope 12' of the "Plasma Chromatograph" 10' is defined by the walls of the duct, the right end of which in FIG. 2 is of greater height than the left end. The sample enters by means of the inlet pipe 24' at the left end of the duct, and the electrodes are generally parallel to the flow in the inlet pipe. Sample flow along the upper wall of the duct in FIG. 2 is well above the ion-molecule reaction region between cathode 14' and first shutter grid 18' and thus does not affect the measurements. The flow along the lower wall of the inlet pipe is diverted to the outlet 28' by means of a septum 38 (containing grid 18') and a transverse wall 40 which merges smoothly with the septum at its leading edge. Inert drift gas admitted through inlet 32' is preferably added at a rate which maintains minimum turbulence in the total flow from wall 40 to the outlets 30' and 34'. The measurement chamber is defined between electrodes 14' and 16', and the edges of electrodes 14' are preferably spaced from the side walls of the duct, as shown in FIG. 3, so that side-wall-adjacent flow portions do not affect the measurements. The leading edges of electrode 14' and the septum define an aperture for admission of the sample to the measurement chamber.

While preferred forms of the invention have been shown and described, it will be apparent to those skilled in the art that changes can be made without departing from the principles and spirit of the invention.

The invention claimed is:

1. A method of enhancing ion analysis measurements performed upon a gaseous sample supplied to a measurement chamber by an inlet pipe, which comprises causing said sample to flow under laminar flow conditions in said inlet pipe, extracting a central core of said sample from the remainder of the sample in said pipe for admission to said chamber, adjusting the rate of flow relative to the length and cross-dimensions of said pipe to minimize diffusion of the sample between said core and the walls of the inlet pipe, forming different-mobility ions from the sample admitted to said chamber, separating said ions from each other in accordance with their mobility in a drift field, and detecting at least some of said separated ions.

2. A method in accordance with claim 1, further comprising admitting a non-reactive gas to said chamber where said ions are separated.

3. A method in accordance with claim 1, further comprising diverting from said chamber a wall-adjacent portion of the sample gas flow in said inlet pipe.

4. Apparatus for performing ion analysis measurements upon a gaseous sample, which comprises an ion analysis chamber, means including an inlet pipe for supplying a gaseous sample through said pipe under laminar flow conditions to said chamber, means for extracting a core portion of the sample gas flow in said inlet pipe from the remainder of the sample in said pipe and admitting the same to said chamber, the relationship of the cross-dimensions and length of said pipe with respect to the gaseous flow rate being such as to minimize diffusion between said core and the walls of said pipe, means for forming different-mobility ions from said sample in said chamber, means for separating said ions from each other in accordance with their mobility, and means for detecting at least some of the separated ions.

5. Apparatus in accordance with claim 4, said extracting means comprising means defining an aperture.

6. Apparatus in accordance with claim 5, further comprising means for diverting a portion of the sample flow adjacent to the walls of said inlet pipe away from said aperture.

7. Apparatus in accordance with claim 4, said chamber having a series of electrodes therein for performing said separating of said ions.

8. Apparatus in accordance with claim 7, said electrodes being arranged transversely to the direction of sample gas flow in said inlet pipe.

9. Apparatus in accordance with claim 7, said electrodes being arranged substantially parallel to the direction of sample gas flow in said inlet pipe.

10. Apparatus in accordance with claim 7, further comprising means for admitting a non-reactive gas to said chamber.

11. Apparatus in accordance with claim 7, said chamber having outlet means extending transversely from successive portions thereof with electrodes being interposed between said portions.

12. Apparatus in accordance with claim 4, said chamber being defined within a duct having a sample gas inlet at one end and a sample gas outlet at the other end, said extracting means comprising a longitudinal septum in said duct and a transverse wall for diverting a portion of the sample flowing in the inlet pipe from said chamber.

13. Apparatus in accordance with claim 12, said duct having an additional inlet for admitting a non-reactive gas to said chamber at the side of said septum opposite to the sample gas.

14. Apparatus in accordance with claim 13, said duct having an outlet for said non-reactive gas adjacent to the outlet for said sample gas.

15. Apparatus in accordance with claim 4, said chamber having a series of electrodes therein for performing said separating of said ions, at least one of said electrodes being in and substantially parallel to the sample gas flow in said chamber and being spaced from an adjacent wall of said chamber.

16. Apparatus in accordance with claim 15, said one electrode having side edges spaced from adjacent side walls of said chamber.

17. Apparatus in accordance with claim 15, said electrodes being part of a drift cell.

* * * * *